United States Patent
Baksh et al.

(10) Patent No.: US 6,475,265 B1
(45) Date of Patent: Nov. 5, 2002

(54) PRESSURE SWING ADSORPTION METHOD FOR PRODUCTION OF AN OXYGEN-ENRICHED GAS

(75) Inventors: Mohamed Safdar Allie Baksh, Amherst, NY (US); Atanas Serbezov, Amherst, NY (US); Frank Notaro, Amherst, NY (US); Frederick Wells Leavitt, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/176,336

(22) Filed: Oct. 22, 1998

(51) Int. Cl.[7] ............................................. B01D 53/047
(52) U.S. Cl. ................. 95/96; 95/101; 95/102; 95/105; 95/118; 95/130; 95/138
(58) Field of Search ........................ 95/96–98, 100–105, 95/117, 118, 121, 122, 130, 138, 139, 902

(56) References Cited

U.S. PATENT DOCUMENTS

| | | | | |
|---|---|---|---|---|
| 4,070,164 A | * | 1/1978 | Miwa et al. ............... | 95/130 X |
| 4,190,424 A | | 2/1980 | Armond et al. ................ | 55/58 |
| 4,386,945 A | * | 6/1983 | Gardner .................... | 95/130 X |
| 4,448,592 A | * | 5/1984 | Linde ........................ | 95/130 |
| 4,477,264 A | * | 10/1984 | Kratz et al. ............... | 95/130 X |
| 4,566,881 A | * | 1/1986 | Richter et al. ............. | 95/130 X |
| 4,661,125 A | * | 4/1987 | Haruna et al. ............. | 95/138 X |
| 4,744,803 A | * | 5/1988 | Knaebel .................... | 95/130 X |
| 4,756,723 A | * | 7/1988 | Sircar ........................ | 95/130 X |
| 4,869,733 A | * | 9/1989 | Stanford ................... | 95/138 X |
| 4,880,443 A | * | 11/1989 | Miller et al. ............... | 95/130 X |
| 4,959,083 A | | 9/1990 | Garrett ....................... | 55/26 |
| 4,973,339 A | | 11/1990 | Bansal ....................... | 55/31 |
| 5,084,075 A | * | 1/1992 | Sircar ........................ | 95/103 X |
| 5,137,549 A | | 8/1992 | Stanford et al. ............. | 55/26 |
| 5,226,933 A | | 7/1993 | Knaebel et al. ............. | 55/26 |
| 5,395,427 A | | 3/1995 | Kumar et al. ............... | 95/101 |
| 5,470,378 A | | 11/1995 | Kandybin et al. ........... | 95/100 |
| 5,507,857 A | * | 4/1996 | Kumar et al. ............... | 95/101 |
| 5,658,371 A | * | 8/1997 | Smolarek et al. .......... | 95/130 X |
| 5,674,311 A | * | 10/1997 | Notaro et al. ............. | 95/96 |
| 5,735,938 A | * | 4/1998 | Baksh et al. .............. | 95/138 X |
| 5,914,455 A | * | 6/1999 | Jain et al. ................. | 95/96 |

OTHER PUBLICATIONS

Seeman et al, "Modelling of a Pressure Swing Adsorption Process for Oxygen Enrichment with Carbon Molecular Sieve", *Chem. Eng. Technol, II* (1988) 341–351.
S. Hayashi et al, "Dynamics of high purity oxygen PSA", *Gas Sep.*, vol. 10, No. 1, pp. 19–23, 1996.

* cited by examiner

*Primary Examiner*—Robert H. Spitzer
(74) *Attorney, Agent, or Firm*—Robert J. Follett

(57) ABSTRACT

The present invention is a two stage PSA process for producing high purity oxygen from a feed air stream. Water, carbon dioxide and nitrogen are removed in a first stage. An oxygen selective adsorbent is used to adsorb oxygen in the second stage. High purity oxygen product is recovered during regeneration of the second stage. Importantly, the high purity of the oxygen product is achieved without inclusion of an oxygen rinse step in the process cycle. The high purity oxygen product is obtained by collecting the middle cut of the second stage effluent stream during regeneration.

19 Claims, 5 Drawing Sheets

PRESSURE SWING ADSORPTION METHOD FOR PRODUCTION OF AN OXYGEN-ENRICHED GAS

This invention was made with United States Government supported under Cooperative Agreement No. 70NANB5H1093, awarded by the Department of Commerce National Institute of Standards and Technology.

The United States Government has certain rights in the invention.

FIELD OF THE INVENTION

This invention relates to a two stage pressure swing adsorption (PSA) process for producing high purity gas from a mixture of a plurality of gases and more particularly, to a PSA process for producing high purity oxygen from air.

BACKGROUND OF THE INVENTION

Conventional PSA processes for generating oxygen from an air stream commonly use a fixed bed of adsorbent material adapted to adsorb nitrogen from air, such as zeolite, so that an oxygen-rich product gas exits the bed. The principles of separation involved in such an adsorption system are based upon equilibrium separation, i.e., upon the adsorbent material's ability to hold nitrogen more strongly than oxygen. Present-day synthetic zeolites used in PSA processes are capable of achieving virtually a complete separation between nitrogen and oxygen. However, the adsorption isotherms of oxygen and argon on these materials are almost identical and a passage of feed air through a zeolite bed has no significant effect on the ratio of oxygen to argon which is typically about 21:1. Thus, the percentage by volume of argon in the oxygen-rich product stream, assuming that all of the nitrogen is adsorbed by the zeolite, is about 5 percent. Therefore, PSA processes which employ nitrogen equilibrium selective materials cannot normally generate a product stream containing an oxygen concentration which is appreciably greater than 95.0 percent.

Materials which preferentially adsorb oxygen can also be employed in PSA processes for producing oxygen from an air stream. In such a process, the oxygen-rich product is collected from the adsorbent bed during the regeneration step of each cycle. At the present time the most commonly used oxygen selective adsorbent materials are carbon molecular sieves (CMS). The separation achieved with CMS is a result of the material's more rapid adsorption of oxygen than of nitrogen—which is known as kinetic selectivity. From the point of view of oxygen/nitrogen separation, the kinetic selectivity of CMS is significantly less efficient than the equilibrium selectivity of zeolite. Further, the oxygen product obtained from an air feed, using CMS as an adsorbent material, contains a considerable portion of unseparated nitrogen.

In practice the rates of adsorption of nitrogen and argon on CMS are about the same so that in the case of an air feed, the balance of the oxygen product will contain nitrogen and argon approximately in their atmospheric ratio 78:1.

In summary, PSA processes for production of oxygen from air which use nitrogen equilibrium selective adsorbents can give maximum oxygen purity of about 95.0%, with the balance represented virtually entirely by argon. PSA processes for production of oxygen from air, which use CMS as the adsorbent, can give a maximum oxygen purity of about 80%, with the balance represented by nitrogen and argon in their atmospheric ratio, i.e., about 19.75% nitrogen and 0.25% argon.

However, oxygen of a purity greater than 95.0% is needed in welding and cutting processes as well as in some medically-related applications. Accordingly, it is desirable to provide a PSA process capable of generating a product stream containing an oxygen concentration which is greater than 95.0 percent from an air feed stream.

Several PSA systems are known in the prior art which can produce a product stream containing an oxygen concentration which is greater. than 95.0% from an air feed stream. All such systems utilize a two stage PSA arrangement, i.e., there are two distinct mass transfer zones in the PSA process.

One group of two stage PSA processes for production of high purity oxygen from feed air is represented by U.S. Pat. No. 4,190,424 (Armond et al.), U.S. Pat. No. 4,959,083 (Garrett), U.S. Pat. No. 4,973,339 (Bansal) and by publications by Seemann et al. (Chem. Eng. Technol. Vol 11, p 341, 1988) and Hayashi et. al. (Gas Sep. Purif. Vol 10 No. 1, p 19, 1996). The first stage employs one or several beds of a CMS which adsorbs oxygen more rapidly, as compared to nitrogen and argon (i.e., an oxygen kinetically-selective material). A feed stream of air constituents (i.e., oxygen, nitrogen, and argon) is delivered to the first stage where oxygen is adsorbed at a higher rate than nitrogen and argon. The adsorbed oxygen is subsequently desorbed and is fed to a second stage which uses one or several beds of zeolite that adsorbs nitrogen preferentially to oxygen and argon (nitrogen equilibrium-selective material). High purity oxygen is collected at the exit of the zeolite bed.

The key to the high purity oxygen product obtained from this PSA process is not just the ability of the first CMS stage to provide an oxygen-enriched feed to the second nitrogen adsorbing zeolite stage. More particularly, it is the ability of the CMS stage to provide a feed which is depleted in argon, the one major constituent of atmospheric air which a zeolite is incapable of separating from oxygen.

Another group of two stage PSA processes for production of high purity oxygen from feed air is represented by U.S. Pat. No. 5,395,427 (Kumar et al.), U.S. Pat. No. 5,137,549 (Stanford et al.) and U.S. Pat. No. 4,190,424 (Armond et al.). The first stage comprises two beds of zeolite and separates nitrogen, carbon dioxide and water vapor from atmospheric air and passes oxygen, argon and residual nitrogen to the second stage. The second stage includes a pair of beds with oxygen selective material that adsorb oxygen and pass the argon and the residual nitrogen. The high purity oxygen product is recovered upon depressurization of the second stage.

The high purity of the oxygen product is achieved by rinsing the oxygen selective adsorbent with high purity oxygen prior to the depressurization step.

Another two stage PSA process for production of high purity oxygen from feed air is disclosed in U.S. Pat. No. 4,959,083 (Garrett). The first stage comprises a bed of CMS which adsorbs oxygen more rapidly than nitrogen. The adsorbed oxygen is desorbed from the first stage and flows to a second stage which comprises another bed of CMS. The adsorbed oxygen in the second stage is subsequently desorbed and collected as high purity oxygen product.

Another group of two stage PSA processes for production of high purity oxygen from feed air is represented by U.S. Pat. No. 5,226,933 (Knaebel et al.) and U.S. Pat. No. 5,470,378 (Kandybin et al.). A first stage utilizes nitrogen equilibrium-selective adsorbent (zeolite) while the second stage utilizes an argon equilibrium selective adsorbent (silver mordenite). The adsorbents can be placed in separate beds or in a single bed. When the feed air is introduced into the system, nitrogen is removed in the first stage, argon is removed in the second stage, and high purity oxygen is collected at the exit of the system as product.

There are a number of drawbacks in the prior art PSA processes for producing high purity oxygen from an air feed.

1. In the prior art there is an incompatibility between the stage cycle times when one of the stages utilizes an equilibrium selective adsorbent such as zeolite and the other stage utilizes a kinetically selective adsorbent such as CMS. This leads to an asynchronous mode of operation of the stages and complicates the PSA cycle. In addition, a buffer tank must be placed between the stages.

2. The mode of operation of a CMS requires relatively high adsorption pressures—typically between 6 atm and 10 atm. For silver mordenite the required adsorption pressures are even higher—between 10 atm and 20 atm. Thus such prior art PSA systems are characterized by high energy consumption.

3. The prior art PSA systems which use an oxygen selective adsorbent in the second stage always employ an oxygen rinse prior to the depressurization in order to achieve high purity of the oxygen product. This reduces the productivity of the PSA system because high purity oxygen product is used as the rinse gas. Also, power requirements increase because the high purity oxygen product is obtained at low pressure during depressurization and at least a portion of the high purity oxygen product must be recompressed again to the high adsorption pressure to supply the cocurrent (with respect to the feed) high pressure purging gas.

4. The prior art PSA processes which use an oxygen selective adsorbent in the second stage rely on use of oxygen enriched streams from the second stage oxygen selective beds for regeneration of the first stage nitrogen selective beds, resulting in a decrease in the productivity of the second stage beds.

Accordingly, it is an object of the invention to provide an improved dual stage PSA process for the production of high purity oxygen, wherein only equilibrium selective adsorbents are employed and the operation of the stages is synchronized.

It is another object of the invention to provide an improved dual stage PSA process for the production of high purity oxygen, which employs modest adsorption pressures and thus exhibits reduced power requirements.

It is a further object of the invention to provide an improved dual stage PSA process for the production of high purity oxygen, which avoids the need for use of an oxygen rinse step.

It is a further object of the invention to provide an improved dual stage PSA process for the production of high purity oxygen, which enables recovery as product, all of the high purity oxygen effluent of the second stage bed, thereby increasing the productivity of the second stage.

SUMMARY OF THE INVENTION

The present invention is a two stage PSA process for producing high purity oxygen from a feed air stream. Water, carbon dioxide and nitrogen are removed in a first stage. An oxygen selective adsorbent is used to adsorb oxygen in the second stage. High purity oxygen product is recovered during regeneration of the second stage. Importantly, the high purity of the oxygen product is achieved without inclusion of an oxygen rinse step in the process cycle. The high purity oxygen product is obtained by collecting the middle cut of the second stage effluent stream during regeneration.

In brief, the method of the invention:

i) produces high purity (>95.5%) oxygen using oxygen equilibrium selective adsorbent;

ii) uses no high pressure rinse step (cocurrent displacement step) in the PSA cycle;

iii) enables upper and lower stages to be regenerated independently and avoids interaction between the stages during regeneration; and iv) operates the stages in synchronism using the same step times, consequently, avoiding need for buffer tank(s) between the stages.

DETAILED DESCRIPTION OF THE PREFERRED EMBODIMENTS

The PSA cycle of this invention incorporates an $O_2$ equilibrium selective adsorbent, which produces an oxygen-enriched product. An adsorbent having an $O_2/N_2$ equilibrium selectivity and little $O_2/N_2$ rate selectivity is used. A preferred oxygen equilibrium selective adsorbent is designated IC2. The compound designated as IC2, typically abbreviated as Co{3,5-diBu$^r$sal/(EtO) (CO$_2$Et)Hmal-DAP}, is the cobalt (II) complex of the dianion of a chelating ligand prepared formally by the 1:1 condensation of ethoxymethylene diethylmalonate and 3,4-diamino pyridine, followed by schiff base condensation of the 3,5-di-tert-butysalicylaldehyde. Other $O_2$ equilibrium selective adsorbents may also be used.

It is preferred that the nitrogen equilibrium selective adsorbent be a faujasite-type zeolite, at least 80% lithium exchanged with a $SiO_2/Al_2)_3$ molar ratio, of 2.3. The preferred nitrogen equilibrium selective adsorbent is henceforth referred to as LiX zeolite.

Figure 1:
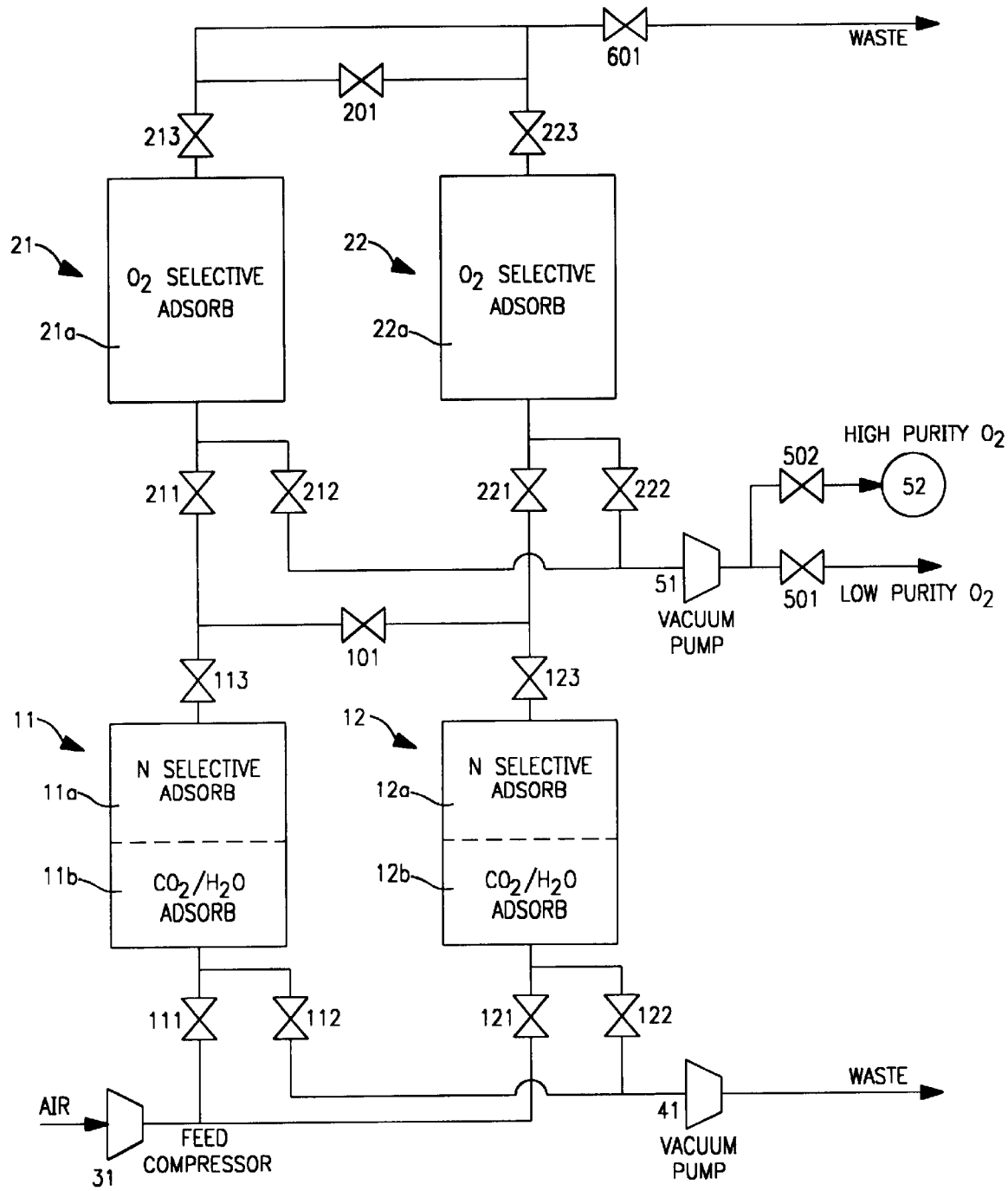
FIG. 1 is a schematic diagram illustrating one embodiment of the present invention using serial beds and a single withdrawal conduit.
Figure 2A:
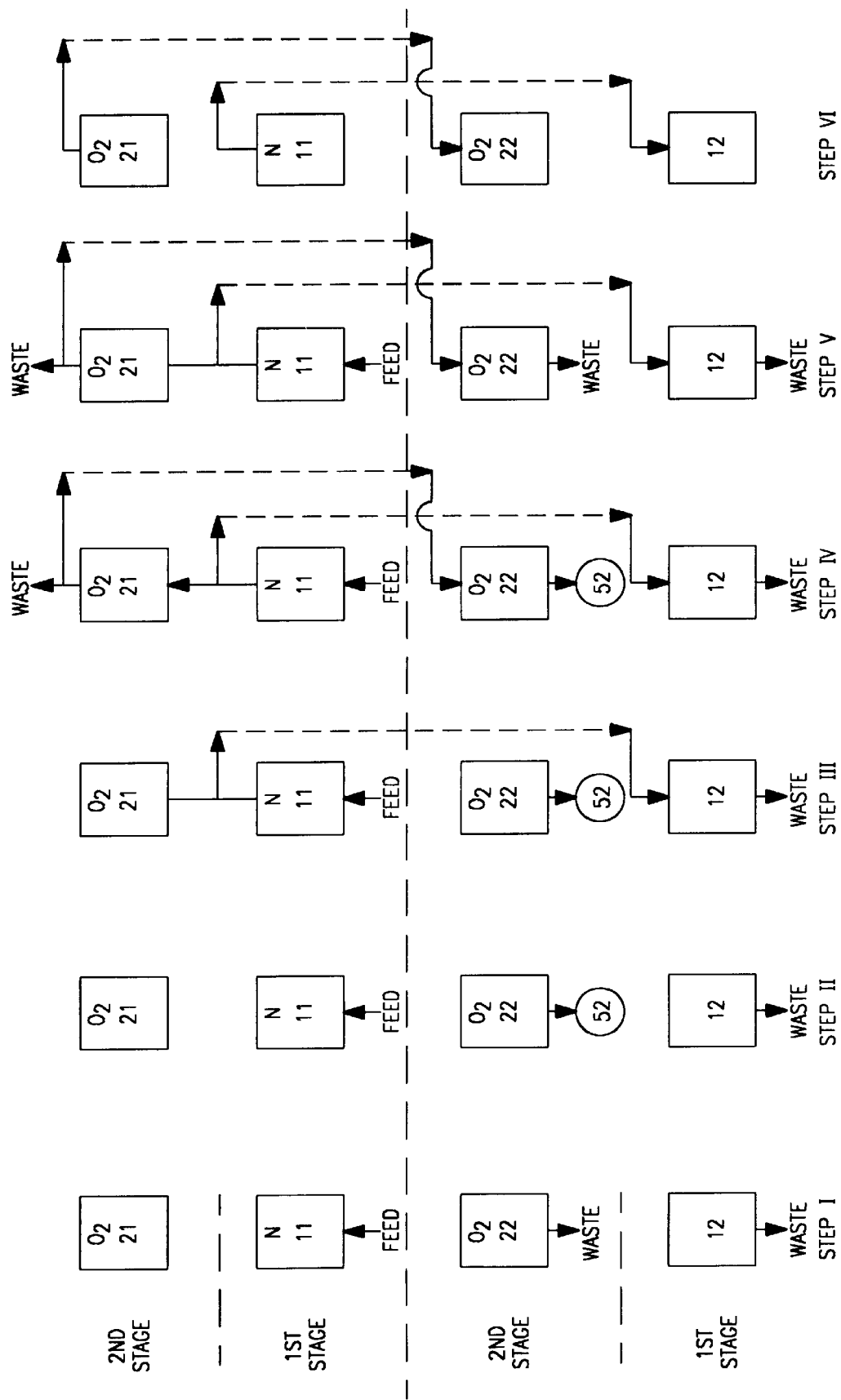
FIG. 2A illustrates the steps during the first half-cycle of the method of the invention.
Figure 2B:
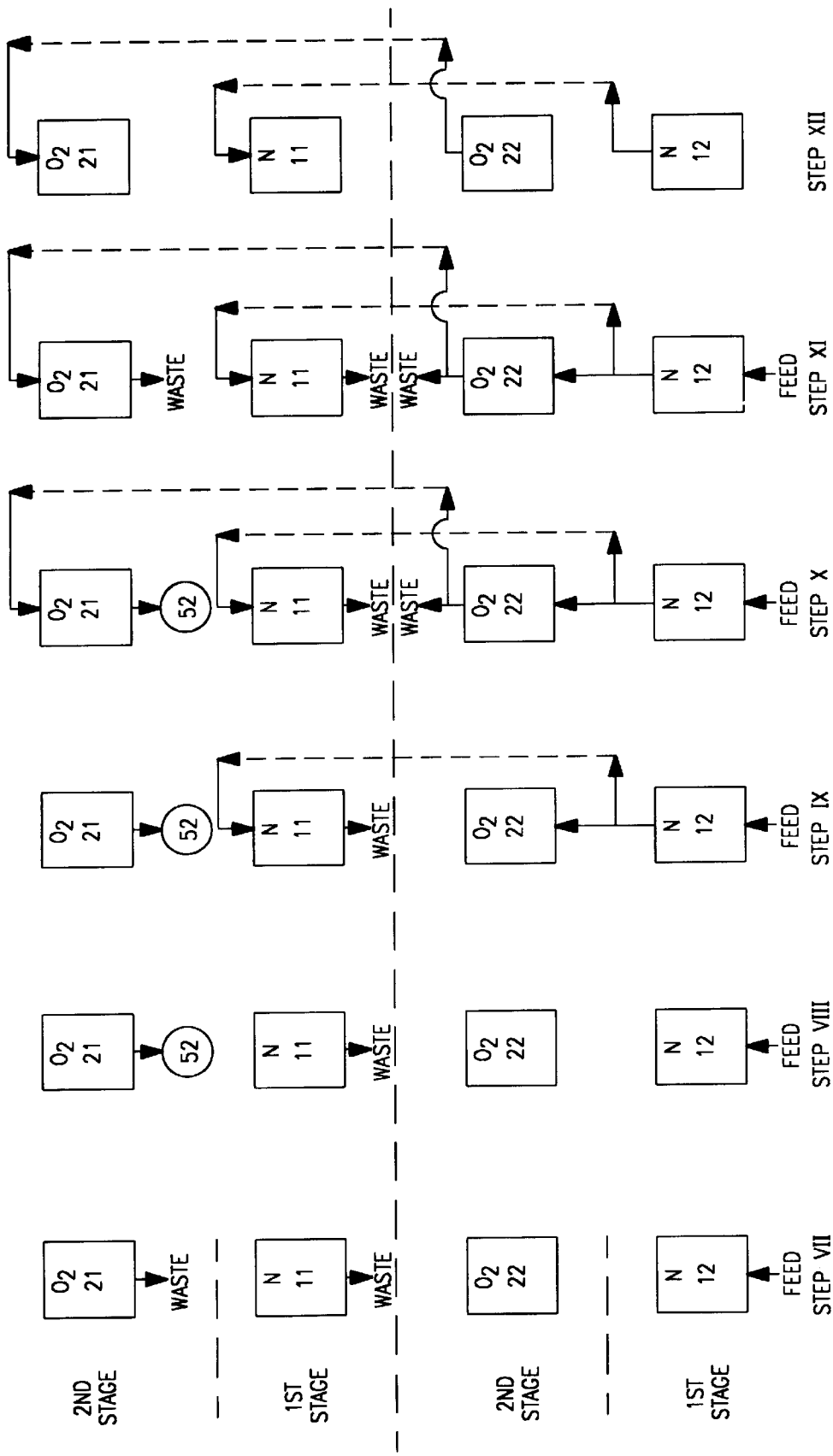
FIG. 2B illustrates the steps during the second half-cycle of the method of the invention.

The preferred embodiment of the invention will be described in detail with reference to FIGS. 1, 2A, and 2B. FIG. 1 is a schematic diagram illustrating the present invention. The system comprises two trains of adsorbers. Each train comprises a first stage adsorber in series with a second stage adsorber. In addition, each train of adsorbers undergoes its respective cycle of steps while collectively operating in parallel with one another. FIG. 2A illustrates the steps during the first half-cycle of the process. FIG. 2B illustrates the steps during the second half-cycle of the process.

Table 1 below summarizes the valve sequence for one complete cycle while Table 2 summarizes the time intervals and the step sequence for one complete process cycle. Tables 1 and 2 utilize 80 time units to cover the twelve steps of the cycle so that the relative times for each step can be clearly indicated.

TABLE 1

Valve sequence during the process cycle.
(O = open, C = closed)

| Valve No. | I | II | III | IV | V | VI | VII | VIII | IX | X | XI | XII |
|---|---|---|---|---|---|---|---|---|---|---|---|---|
| 111 | O | O | O | O | O | C | C | C | C | C | C | C |
| 112 | C | C | C | C | C | C | O | O | O | O | O | C |
| 113 | C | C | O | O | O | O | C | C | O | O | O | O |
| 211 | C | C | O | O | O | C | C | C | C | C | C | C |
| 212 | C | C | C | C | C | C | O | O | O | O | O | C |
| 213 | C | C | C | O | O | O | C | C | C | O | O | O |
| 121 | C | C | C | C | C | C | O | O | O | O | O | C |
| 122 | O | O | O | O | O | C | C | C | C | C | C | C |
| 123 | C | C | O | O | O | O | C | C | O | O | O | O |
| 221 | C | C | C | C | C | C | C | C | O | O | O | C |
| 222 | O | O | O | O | O | C | C | C | C | C | C | C |
| 223 | C | C | C | O | O | O | C | C | C | O | O | O |
| 101 | C | C | O | O | O | O | C | C | O | O | O | O |
| 201 | C | C | C | O | O | O | C | C | C | O | O | O |
| 501 | O | C | C | C | O | O | O | C | C | C | O | O |
| 502 | C | O | O | O | C | C | C | O | O | O | C | C |
| 601 | C | C | C | O | O | C | C | C | C | O | O | C |

TABLE 2

Time intervals and step sequence of the process cycle.

| Step Number | Time Interval | Bed Number | | | |
|---|---|---|---|---|---|
| | | 11 | 12 | 21 | 22 |
| I | 0–1 | RP | EV | ID | EV |
| II | 1–14 | RP | EV | ID | EV |
| III | 14–16 | AD | PG | RP | EV |
| IV | 16–22 | AD | PG | AD | PG |
| V | 22–28 | AD | PG | AD | PG |
| VI | 28–40 | EQ | EQ | EQ | EQ |
| VII | 40–41 | EV | RP | EV | ID |
| VIII | 41–54 | EV | RP | EV | ID |
| IX | 54–56 | PG | AD | EV | RP |
| X | 56–62 | PG | AD | PG | AD |
| XI | 62–68 | PG | AD | PG | AD |
| XII | 68–80 | EQ | EQ | EQ | EQ |

RP = repressurization
AD = adsorption
EQ = pressure equalization
EV = evacuation
PG = purge
ID = idle The PSA process illustrated in FIGS. 1, 2A, and 2B has a first stage comprising two adsorbing beds 11 and 12 each filled with at least two layers of adsorbents. There is at least one layer 11a, 12a of nitrogen equilibrium selective adsorbent which layer is preceded by at least one layer 11b, 12b of adsorbent capable of removing carbon dioxide and water from the feed air.

A second stage comprises two other adsorbing beds 21 and 22, each filled with at least one layer of oxygen equilibrium selective adsorbent 21a, 22a, respectively. A feed compressor 31 provides compressed feed air to beds 11 and 12 through valves 111 and 121, respectively. Beds 11 and 12 are connected to beds 21 and 22, respectively, through valves 113 and 123 and inlet valves 211 and 221, respectively.

A vacuum pump/compressor 41 serves the purpose of evacuating beds 11 and 12 through valves 112 and 122, respectively. The effluent of pump 41 is discharged to atmosphere. A vacuum pump/compressor 51 serves the purpose of evacuating beds 21 and 22 through valves 212 and 222, respectively. The effluent of pump 51 is discharged either to the low purity oxygen line through valve 501 or to high purity oxygen product tank 52 through valve 502.

The upper ends of beds 11 and 12 are connected through a valve 101 and the upper ends of beds 21 and 22 are connected through a valve 201. The effluent of beds 21 and 22 are discharged through valves 213 and 223, respectively, and through valve 601 to atmosphere or are collected as argon-enriched product.

All of the valves in FIG. 1 are operated automatically via computer system program logic which is not shown. In the description that follows all the valves are assumed closed unless explicitly declared as open.

Step I (time units 0–1): Bed 11 is pressurized with feed air via feed compressor 31 and open valve 111. Bed 21 is in an "idle" position. Bed 12 is evacuated to atmosphere through open valve 122 and vacuum pump/compressor 41. Bed 22 is at the beginning of its regeneration sequence and is evacuated through open valve 222 and vacuum pump/compressor 51. The oxygen purity of the effluent of bed 22 is increasing during Step I, but is less than the minimum purity required for the high purity oxygen product. Consequently, the effluent of bed 22 is discharged to the low purity oxygen line during Step I via open valve 222, vacuum pump 51 and open valve 501. Step I is terminated when the effluent of bed 22 reaches the minimum purity required for the higher purity oxygen product.

Step II (time units 1–14): Bed 11 continues to be pressurized with feed air via compressor 31 and open valve 111. Step II is terminated when bed 11 reaches its adsorption pressure. Bed 21 is still in the "idle" position. Bed 12 continues to be evacuated to atmosphere through open valve 122 and vacuum pump 41. Bed 22 continues to be evacuated through open valve 222 and vacuum pump 51.

During Step II, the oxygen purity of the effluent of bed 22 is equal or higher than the minimum purity required for the high purity oxygen product. Thus, the effluent of bed 22 during Step II is collected in the product tank 52 via open valve 222, vacuum pump 51 and open valve 502.

Step III (time units 14–16): Bed 11 is in its adsorption state. Feed air continues to be fed to bed 11 through feed compressor 31 and open valve 111. The effluent stream of bed 11 is enriched in oxygen since water, carbon dioxide and nitrogen have been preferentially adsorbed in the bed. The oxygen enriched effluent of bed 11 is introduced into bed 21 through open valves 113 and 211 and is used to pressurize bed 21. Since the outlet of bed 11 is connected to the inlet of bed 21, beds 11 and 21 are connected in series.

It is important to insure that the mass transfer zone (MTZ) developed in oxygen selective bed 21 has a self-sharpening front. This is achieved by creating a favorable oxygen concentration difference in the oxygen concentration at the outlet of nitrogen selective bed 11 and the oxygen concentration at the inlet of oxygen selective bed 21 at the instant of first communication between the two beds. A favorable oxygen concentration difference for development of a self-sharpening mass transfer zone in oxygen selective bed 21 is created when, at the beginning of pressurization of bed 21, the oxygen purity of the effluent stream coming from bed 11 and used for pressurization of bed 21, is higher than the oxygen purity of the gas phase that exists at that moment at the entrance of bed 21. This favorable oxygen concentration difference creates a self-sharpening MTZ in oxygen selective bed 21 and constitutes an important condition for the optimal operation of the PSA process. If, at the beginning of pressurization of bed 21, the oxygen concentration difference is unfavorable, that is, the oxygen purity of the effluent stream coming from bed 11 and used for pressurization of bed 21 is less than the oxygen purity of the gas phase that exists at that moment at the entrance of bed 21, the MTZ formed in the oxygen selective bed is receding, which leads to poor utilization of the oxygen selective adsorbent, and consequently, to poor performance of the PSA process as a whole.

Step III is terminated when bed 21 reaches its adsorption pressure. Part of the oxygen rich effluent that comes out of bed 11 is introduced via open valves 101 and 123 to bed 12 and is used for low pressure countercurrent purge of bed 12. The effluent of bed 12 is discharged to atmosphere through open valve 122 and vacuum pump/compressor 41. Bed 22 continues to be evacuated through open valve 222 and vacuum pump 51.

During Step III the oxygen purity of the effluent of bed 22 is equal or higher than the minimum purity required for the high purity oxygen product. Thus, the effluent of bed 22 during Step III continues to be collected in the product tank 52 via open valve 222, vacuum pump 51 and open valve 502.

It is to be noted that the oxygen enriched stream necessary for the regeneration of the first stage bed (bed 12) is provided by the other first stage bed (bed 11) which is in its adsorption state. Thus, the entire oxygen enriched effluent that comes out of second stage bed 22 can be collected as product, increasing the productivity of the process.

Step IV (time units 16–22): Beds 11 and 21 are both in their adsorption state. Feed air is introduced to bed 11 through compressor 31 and open valve 111. The oxygen enriched effluent of bed 11 is introduced into bed 21 through open valves 113 and 211. oxygen is preferentially adsorbed in bed 21 and an oxygen depleted effluent is discharged as waste or collected as argon enriched product from bed 21, via open valves 213 and 601.

Part of the oxygen rich effluent that comes out of bed 11 is introduced via open valves 101 and 123 to bed 12 and is used for low pressure countercurrent purge of bed 12. The effluent of bed 12 is discharged to atmosphere through open valve 122 and vacuum pump/compressor 41. Part of the oxygen depleted effluent that comes out of bed 21 is introduced via open valves 201 and 223 to bed 22 and is used for low pressure countercurrent purge of bed 22.

The oxygen purity of the effluent of bed 22 is decreasing during Step IV but is higher than the minimum purity required for the high purity oxygen product. Consequently, the effluent of bed 22 continues to be collected in the product tank 52 via open valve 222, vacuum pump 51 and open valve 502. Step IV is terminated when the effluent of bed 22 reaches the minimum purity required for the high purity oxygen product.

Step V (time units 22–28): Beds 11 and 21 continue to be in adsorption phases. Feed air continues to be fed to bed 11 through feed compressor 31 and open valve 111. The oxygen enriched effluent of bed 11 is introduced into bed 21 through open valves 113 and 211. Oxygen is preferentially adsorbed in bed 21 and an oxygen depleted effluent is discharged from bed 21 via open valves 213 and 601.

Part of the oxygen rich effluent that comes out of bed 11 is introduced via open valves 101 and 123 to bed 12 and is used for low pressure countercurrent purge of bed 12. The effluent of bed 12 is discharged to atmosphere through open valve 122 and vacuum pump/compressor 41.

Part of the oxygen depleted effluent that comes out of bed 21 is introduced via open valves 201 and 223 to bed 22 and is used for low pressure countercurrent purge of bed 22. The oxygen purity of the effluent of bed 22 is decreasing further during Step V and is now below the minimum purity required for high purity oxygen product. Consequently, the effluent of bed 22 is discharged to the low purity oxygen line during Step V, via open valve 222, vacuum pump 51 and open valve 501. Step V is terminated when the mass transfer zones in beds 11 and 21 reach the effluent ends of the beds and are about to break through.

An important feature of the present invention is the synchronized operation of the beds so that the mass transfer zones reach the ends of the beds at the same time. This synchronization leads to a better utilization of the adsorbent material in the beds and eliminates the necessity of a buffer tank between the stages.

Step VI (time units 28–40): First stage bed 11 which is at high adsorption pressure and first stage bed 12 which is at low regeneration pressure are connected through open valves 113, 101 and 123 to equalize their pressures. At the same time the second stage bed 21 which is at high adsorption pressure and the second stage bed 22 which is at low regeneration pressure equalize their pressures through open valves 213, 201 and 223.

It is important to note that at the end of the equalization step, the oxygen purity of the gas phase that exists (at that moment) at the bottom end of bed 22 is lower than the oxygen purity of the oxygen enriched stream that will be supplied to bed 22 later in the cycle (Step IX) from first stage bed 12. As pointed out above, this creates a favorable difference in oxygen concentration at the outlet of nitrogen selective bed 12 and the oxygen concentration at the inlet of oxygen selective bed 22, at instant of first communication between the two beds. This action leads to a sharp mass transfer zone in bed 22. Also, the effluent gas coming out of bed 21 that is used to partially repressurize bed 22 is depleted in oxygen, which also leads to a sharpening of the mass transfer zone in the second stage during subsequent adsorption steps.

Steps VII–XII (time units 40–80): Steps VII–XII constitute the second half-cycle of the process. In the second half-cycle beds 11 and 21 repeat the steps of beds 12 and 22 in the first half-cycle, respectively, and vice versa. The steps of the second half-cycle are shown in FIG. 2B.

Tables 3 and 4 below give examples of the operating conditions and PSA process performance, using nitrogen and oxygen equilibrium selective adsorbents in the lower and upper beds, respectively. In the tables, the symbols have the following meaning: TPD=ton (2000 lb) per day of oxygen, kPa=1000 Pa=S.I. unit for pressure (1.0 atm.= 101.323 kPa, s=time unit in seconds, kW=kilowatt). Also, in the tables, the nitrogen equilibrium selective adsorbent is a faujasite-type zeolite, at least 80% lithium exchanged, and the oxygen equilibrium selective adsorbent is IC2, as described above.

Table 3: Gives an example using two trains of two beds in series for production of high purity (>95%) oxygen; wherein, the lower bed of each train contains a faujasite-type zeolite, at least 80% lithium exchanged, and the upper bed of each train contains IC2. The results shown below were obtained from PSA simulation results for the case where all of the oxygen is recovered from the upper bed during the regeneration step(s) of the PSA process, and feed (air) enters the lower bed. In this case, the desorption pressure is high enough to facilitate the use of a single stage machine for the evacuation step(s) of the PSA process.

Table 3: An example using the PSA process of the invention.
- Adsorbent in Lower Bed: LiX zeolite
- Adsorbent in Upper Bed: IC2
- Feed Composition: 79% $N_2$, 21% $O_2$
- High Pressure: 160 kPa
- Low Pressure: 45 kPa
- Feed Rate: $2.15 \times 10^5$ NCFH
- Amount of $O_2$ Produced: 15.37 TPD
- Oxygen Purity: 98.10%
- Overall oxygen Recovery: 45.7%
- Bed Size Factor: 286.5 lb/TPD $O_2$
- Power: 6.35 kW/TPD
- Temperature: 300 K Table 4: An example using two trains of two beds in series for production of high purity (>95%) oxygen; wherein, the lower bed of each train contains a faujasite-type zeolite, at least 80% lithium exchanged, and the upper bed of each train contains IC2. The results shown below were obtained from PSA simulation results for the case where all of the oxygen is recovered from the upper bed during the regeneration step(s) of the PSA process, and feed (air) enters the lower bed. In this case, the lower desorption pressure requires use of a two stage machine for the evacuation step(s) of the PSA process. Table 4: A further example using the PSA process of the invention:
- Adsorbent in Lower Bed: LiX zeolite
- Adsorbent in Upper Bed: IC2
- Feed Composition: 79% $N_2$, 21% $O_2$
- High Pressure: 150 kPa
- Low Pressure: 30 kPa
- Feed Rate: $2.15 \times 10^5$ NCFH
- Amount of $O_2$ Produced: 17.05 TPD
- Oxygen Purity: 98.24%
- Overall oxygen Recovery: 54.3%
- Bed Size Factor: 287.3 lb/TPD $O_2$
- Power: 6.96 kW/TPD
- Temperature: 300 K Table 5: An example using two trains of two beds in series for production of medium purity (<95%) oxygen; wherein, the lower bed of each train contains a faujasite-type zeolite, at least 80% lithium exchanged, and the upper bed of each train contains IC2. The results shown below were obtained from PSA simulation results for the case where all of the oxygen is recovered from the upper bed during the regeneration step(s) of the PSA process, and feed (air) enters the lower bed. In this case, the lower desorption pressure requires use of a two stage machine for the evacuation step(s) of the PSA process.

Table 5: An example for producing medium purity oxygen.
- Adsorbent in Lower Bed: LiX zeolite
- Adsorbent in Upper Bed: IC2
- Feed Composition: 79% $N_2$, 21% $O_2$
- High Pressure: 150 kPa
- Low Pressure: 30 kPa
- Feed Rate: $2.15 \times 10^5$ NCFH
- Amount of $O_2$ Produced: 23.80 TPD
- Oxygen Purity: 93.65%
- Overall oxygen Recovery: 75.9%
- Bed Size Factor: 205.6 lb/TPD $O_2$
- Power: 4.98 kW/TPD
- Temperature: 300 K Table 6: An example using two trains of two beds in series for production of medium purity (<95%) oxygen; wherein, the lower bed of each train contains a faujasite-type zeolite, at least 80% lithium exchanged, and the upper bed of each train contains IC2. The results shown below were obtained from PSA simulation results for the case where a portion of the oxygen is recovered from the lower bed during the adsorption step, additional oxygen is recovered from the upper bed during the regeneration step(s) of the PSA process, and feed (air) enters the lower bed. This example used serial beds with a dual withdrawal of product.

Figure 3:
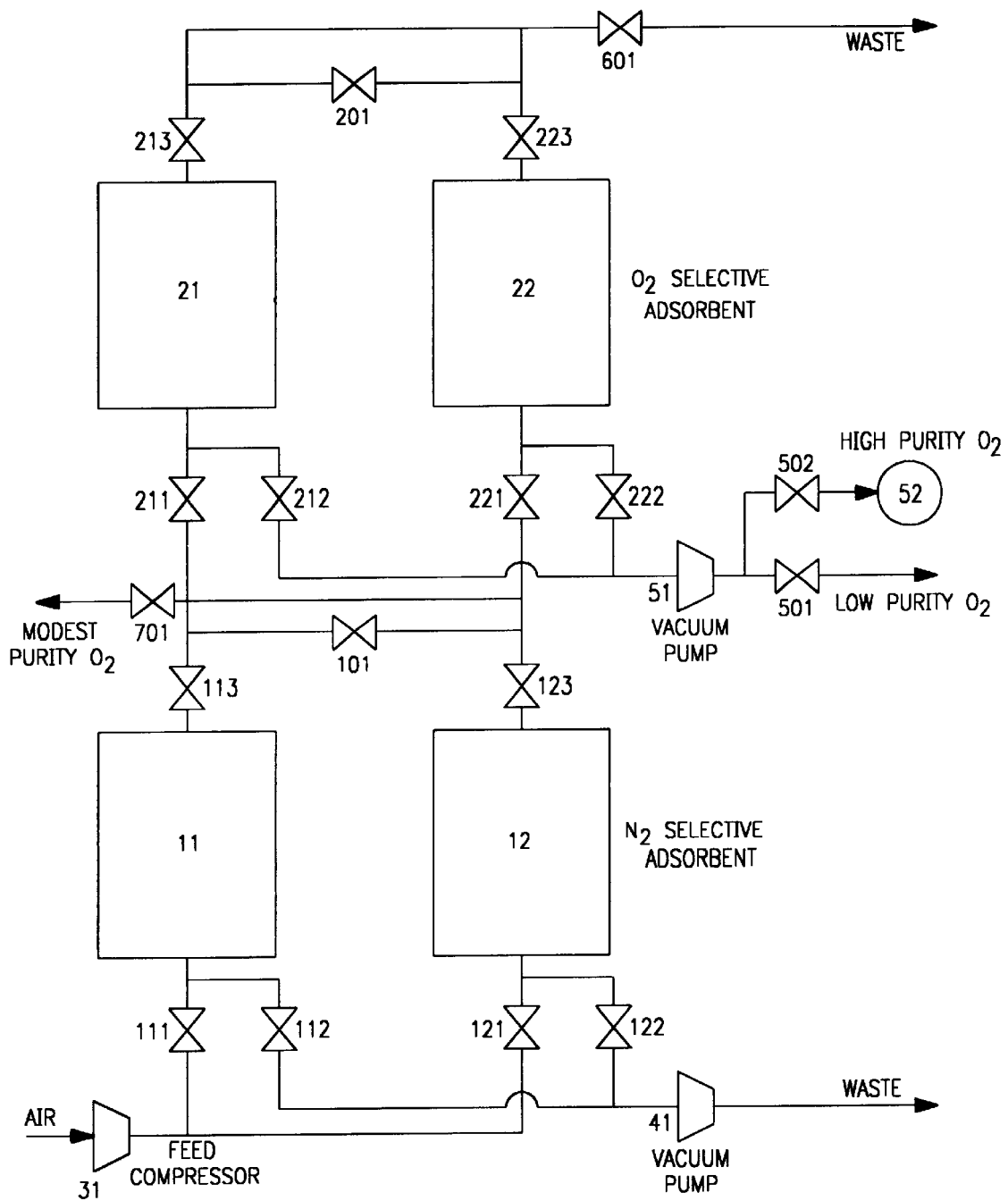
FIG. 3 is a schematic diagram illustrating a second embodiment of the present invention using serial beds and dual withdrawal conduits.

Table 6: Another example for medium purity oxygen
- Adsorbent in Lower Bed: LiX zeolite
- Adsorbent in Upper Bed: IC2
- Feed Composition: 79% $N_2$, 21% $O_2$
- High Pressure: 150 kPa
- Low Pressure: 30 kPa
- Feed Rate: $2.15 \times 10^5$ NCFH
- Amount of $O_2$ Produced: 21.20 TPD
- Oxygen Purity (LiX Bed): 89.81%
- Oxygen Purity (IC2 Bed): 90.7%
- Oxygen Recovery (LiX Bed): 56.05%
- Oxygen Recovery (IC2 Bed): 86.2%
- Overall Oxygen Recovery 54.39%
- Bed Size Factor (LiX Bed): 251.7 lb/TPD $O_2$
- Bed Size Factor (IC2 Bed): 25.20 lb/TPD $O_2$
- Power: 4.59 kW/TPD
- Temperature: 300 K In an alternative mode of operation illustrated in FIG. 3, oxygen product of modest purity (~90%) is collected in the beginning of adsorption from the effluent stream of the nitrogen selective bed 11 or 12 via open valves 113 and 701, or 123 and 701, respectively. As adsorption in the nitrogen selective bed continues with decreasing oxygen purity, the lower purity effluent of the bed(s) is passed to the oxygen selective bed(s) wherein oxygen is recovered upon regeneration via vacuum pump 51. This mode is referred to as a serial beds dual withdrawal (SBDW) mode, and the PSA simulation results for this case are shown in Table 6. Note, that results shown in Table 6 were obtained using a well defined cycle. However, it should be noted that other PSA cycles could be used without deviating from the scope of this alternative mode of operation, i.e., serial beds, dual withdrawal.

Figure 4:
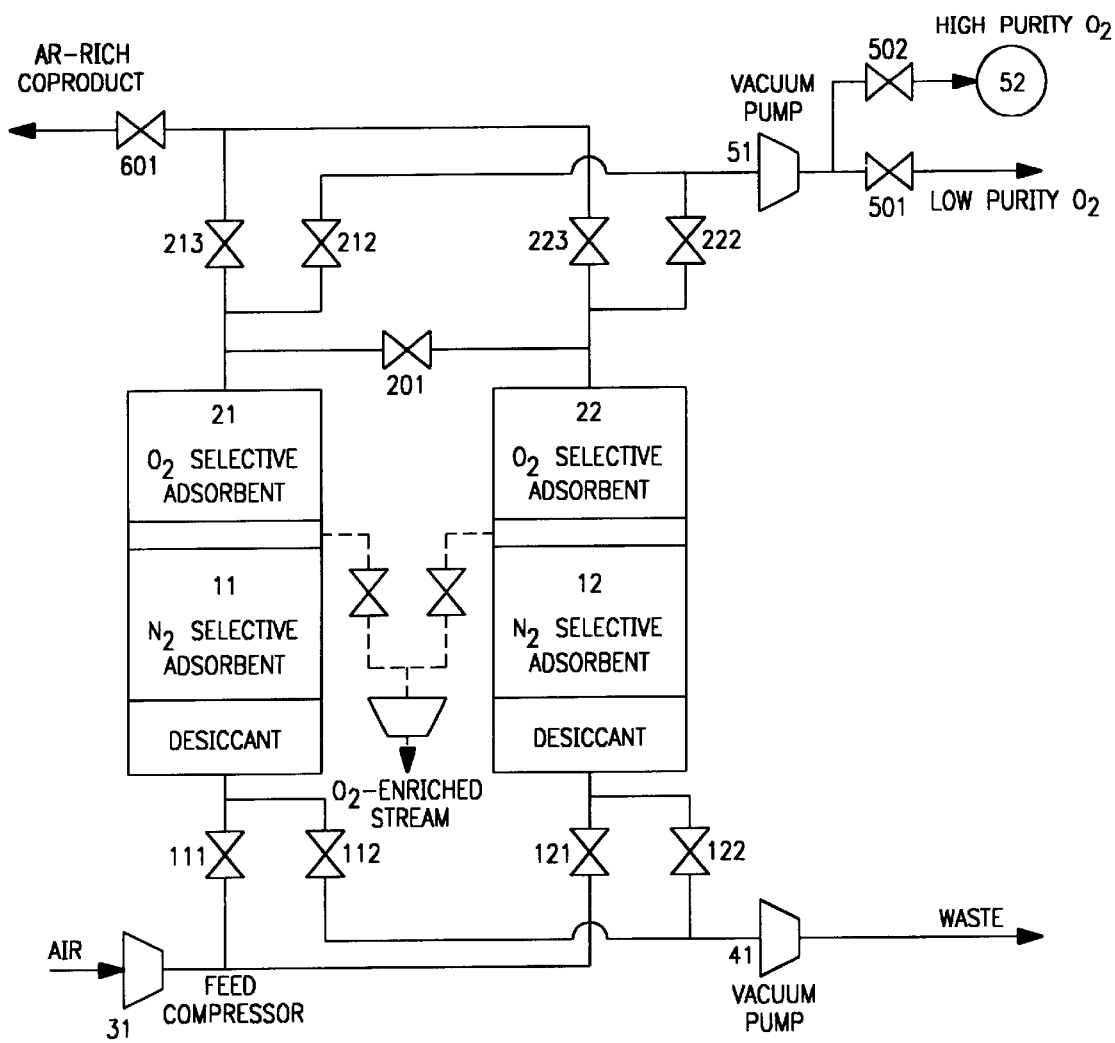
FIG. 4 is a schematic diagram illustrating a third embodiment of the present invention using single vessels with multiple bed layers.

In another mode of operation as illustrated in FIG. 4, the $N_2$ and $O_2$ equilibrium selective adsorbents are placed in the same bed. In this arrangement, the nitrogen adsorbent layer is placed near the feed end, and the $O_2$ selective adsorbent layer is placed above it in the same vessel. In this mode of operation, feed air enters the bed, passes through the nitrogen selective layer, then through the oxygen selective adsorbent layer to produce Ar rich effluent during the high pressure adsorption step. After a predetermined time, the adsorption step is terminated and the bed is regenerated.

During the regeneration step(s), the adsorbed oxygen in the oxygen selective adsorbent bed is recovered at one end of the bed (not the feed end), and the desorbed gas at the other end (the feed end) of the bed can be discarded as waste. Also, if desired, an additional oxygen-enriched stream may be obtained by evacuating the vessels through a side port at the oxygen selective section of the vessels. In this mode of operation different PSA cycles can be used without deviating from the key features of this invention.

In an alternative mode of operation, Step I may be modified so that the effluent of bed 22 is used to repressurize bed 21. In the same mode of operation the effluent of bed 21 in Step VII is used to pressurize bed 22.

In a further alternative mode of operation, Step I may be modified so that the effluent of bed 22 is recycled to bed 11. The effluent of bed 22 can be recycled either to the feed of bed 11 or it can be introduced at an intermediate point of bed 11 since the effluent of bed 22 in Step I is free of water and carbon dioxide and is partially enriched in oxygen. In the same mode of operation, the effluent of bed 21 in Step VII is recycled to bed 12.

In still another alternative mode of operation Step V may be modified so that the effluent of bed 22 is used to purge bed 12. In the same mode of operation the effluent of bed 21 in step XI is used to purge bed 11.

In further alternative modes of operation (i) Steps VI and XII are modified so that the equalization of the second stage oxygen selective beds is carried out not only by connecting their top ends but by simultaneously connecting their bottom ends as well; and (ii) carbon molecular sieve may be used as an oxygen selective adsorbent in the second stage.

Preferably, the highest adsorption pressure in the two stages is in the range of 1 atm to 4 atm.

Preferably, the lowest desorption pressure in the two stages is in the range of 0.02 atm to 0.75 atm.

Preferably, the average purity of the oxygen enriched stream in the first stage is in the range of 35 percent oxygen to 85 percent oxygen.

In all of the aforementioned PSA processes of this invention, a prepurifier section e.g., a layer of alumina, is placed at the upstream end of the zeolite bed to remove water and carbon dioxide from the feed air.

In other modes of operation, other adsorbents can be used with this invention. For example, 5A, 13X, and mixed cations zeolites can be used as the $N_2$ selective adsorbent in the lower bed, and carbon molecular sieve, clinoptilolite, and mordenite can be used as the $O_2$ selective adsorbent in the upper bed of the two stage PSA process.

Other oxygen equilibrium selective adsorbents can be used instead of IC2. Examples of such oxygen equilibrium selective adsorbents are disclosed in U.S. Pat. No. 5,735,938 and the references therein. Oxygen rate selective adsorbents, such as carbon molecular sieves or zeolites (e.g., 4A, clinoptilolite, mordenite, etc.) can be employed as well).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A Pressure swing adsorption method for extracting high purity oxygen from air, said method employing a first nitrogen selective adsorbent (nsa) bed coupled in series to a first oxygen selective adsorbent (osa) bed, said method spanning a number of time periods and comprising the steps of:
   a) during first and second periods, feeding air to pressurize said first nsa bed to enable an adsorption of nitrogen therein and an output of an oxygen rich stream therefrom;
   b) during a third period, feeding said oxygen rich stream directly to an inlet of said first osa bed so as to pressurize said first osa bed, said oxygen rich stream having a higher oxygen concentration than an oxygen concentration at said inlet so as to create a favorable oxygen concentration difference in said first osa bed such as to sharpen a mass transfer zone in said first osa bed;
   c) during fourth and fifth periods, continuing said flow of said oxygen rich stream to said inlet so as to move said mass transfer zone through said first osa bed until said mass transfer zone is about to break through to an outlet therefrom; and
   d) during a subsequent period, evacuating from an inlet end of said first osa bed, an oxygen rich stream from said first osa bed, said evacuating continuing until a concentration of oxygen in an evacuation stream falls below a determined threshold.

2. The method as recited in claim 1, further employing a second nsa bed coupled in series to a second osa bed, and said second nsa bed and said second osa bed subjected to steps a)-d), but displaced in time by plural periods of application of said steps a)-d) to said first nsa bed and said first osa bed.

3. The method as recited in claim 2, wherein during step b), a portion of the oxygen rich stream from said first nsa bed is fed to said second nsa bed to enable a countercurrent purge thereof, thereby enabling collection of the entire output from said second osa bed during application of step d) thereto.

4. The method as recited in claim 2 wherein, during step c) and prior to said oxygen concentration difference reaching said outlet of said first osa bed, a portion of the outlet from said first osa bed is fed as a countercurrent purge to said second osa bed.

5. The method as recited in claim 2, comprising the further step of:
   e) before step d), equalizing pressures in said first osa bed and said second osa bed, and in said first nsa bed and said second nitrogen adsorbent bed, respectively.

6. The method as recited in claim 2, wherein said first osa bed and first nsa bed are contained in a single vessel, and said second osa bed and second nsa bed are contained in a single vessel.

7. The method as recited in claim 1, wherein said high purity oxygen has a concentration of greater than 95.5%.

8. The method as recited in claim 1, wherein said nsa bed is selected from the group consisting of LiX, 5A, 13X and mixed cation zeolites.

9. The method as recited in claim 1, wherein said osa bed is selected from the group consisting of IC2, carbon molecular sieves and zeolites.

10. A pressure swing adsorption method for extracting high purity oxygen from air, said method employing a first nitrogen selective adsorbent (nsa) bed coupled in series to a first oxygen selective adsorbent (osa) bed, and a second nsa bed coupled in series to a second osa bed, said method comprising the steps of:
    a) during a first period, (i) feeding air to pressurize said first nsa bed to enable an adsorption of nitrogen therein and (ii) commencing regeneration of said second osa by evacuating said bed;
    b) during a second period, (i) continuing a feed of air to pressurize said first nsa bed and to enable a further adsorption of nitrogen therein and (ii) collecting oxygen product from said second osa bed;
    c) during a third period, (i) feeding a portion of said oxygen rich stream from said first nsa bed directly to an inlet of said first osa bed so as to pressurize said first osa bed, said oxygen rich stream having a higher oxygen concentration than an oxygen concentration at said inlet so as to create an oxygen concentration difference in said first osa bed, and (ii) continuing to collect oxygen from said second osa bed and (iii) using a portion of the oxygen rich stream from the first nsa bed as a counterflow purge for said second nsa bed;

d) during a fourth period, (i) continuing said flow of said oxygen rich stream to said inlet of said first osa bed so as to move said oxygen concentration difference through said first osa bed, (ii) employing effluent from said first osa bed as a counterflow purge of said second oxygen adsorbent bed, (iii) feeding a portion of said oxygen rich stream from said first nsa bed as a counterflow purge for said second nsa bed and (iv) continuing collection of oxygen product from said second osa bed until a concentration of oxygen being collected falls below a determined threshold;

e) during a fifth period, (i) continuing said flow of said oxygen rich stream to said inlet of said first osa bed so as to move said oxygen concentration difference through said first osa bed until said oxygen concentration difference is about to break through to an outlet therefrom, (ii) continuing employing effluent from said first osa bed as a counterflow purge of said second osa bed and terminating collection of oxygen product therefrom, and (iii) continuing feeding a portion of said oxygen rich stream from said first nsa bed as a counterflow purge for said second nsa bed;

f) during a sixth period, equalizing pressures in said first and second osa beds and in said first and second nsa beds, respectively; and g) during seventh through twelfth periods, causing (i) said first osa bed to repeat actions of said second osa bed and (ii) said first nsa bed to repeat actions of said second nsa bed and vice-versa.

11. The method as recited in claim 10, wherein operations of said first and second osa beds and of said first and second nsa beds are concurrent and synchronized during each of said periods.

12. The method as recited in claim 10, wherein, during periods when said oxygen rich stream is fed to at least one of said osa beds, a portion of said oxygen rich stream is recovered as a moderate purity oxygen product.

13. The method as recited in claim 10, wherein, during periods when said oxygen rich stream is fed to at least one of said osa beds from a nsa bed and from an osa bed to be recovered, portions of said oxygen rich stream are recovered as a moderate purity oxygen product.

14. The method as recited in claims 10, wherein a highest adsorption pressure in said beds is in a range of 1 atm to 4 atm.

15. The method as recited in claim 10, wherein a lowest desorption pressure in said beds is in a range of 0.02 atm to 0.75 atm.

16. The method as recited in claim 10, wherein an average purity of said oxygen enriched stream from each said nsa bed is in a range of 35 percent oxygen to 85 percent oxygen.

17. The method as recited in claim 10, wherein said osa bed is selected from the group consisting of:IC2, carbon molecular sieves and zeolites.

18. The method as recited in claim 10, wherein said high purity oxygen has a concentration of greater than 95.5%.

19. The method as recited in claim 10, wherein said nsa bed is selected from the group consisting of LiX, 5A, 13X and mixed cation zeolites.

* * * * *